(12) United States Patent
Gao et al.

(10) Patent No.: US 9,788,356 B2
(45) Date of Patent: Oct. 10, 2017

(54) TERMINAL DEVICE, AND FRAME SENDING AND RECEIVING METHODS

(71) Applicant: ZTE Corporation, Shenzhen (CN)

(72) Inventors: Jianbo Gao, Shenzhen (CN); Pengren Wang, Shenzhen (CN)

(73) Assignee: XI'AN ZHONGXING NEW SOFTWARE CO. LTD, Xi'An (CN)

( * ) Notice: Subject to any disclaimer, the term of this patent is extended or adjusted under 35 U.S.C. 154(b) by 40 days.

(21) Appl. No.: 14/914,737

(22) PCT Filed: Feb. 17, 2014

(86) PCT No.: PCT/CN2014/072155
§ 371 (c)(1),
(2) Date: Feb. 26, 2016

(87) PCT Pub. No.: WO2014/135003
PCT Pub. Date: Sep. 12, 2014

(65) Prior Publication Data
US 2016/0212781 A1    Jul. 21, 2016

(30) Foreign Application Priority Data
Aug. 26, 2013  (CN) .......................... 2013 1 0375812

(51) Int. Cl.
*H04W 76/02*        (2009.01)
*H04L 12/805*       (2013.01)
(Continued)

(52) U.S. Cl.
CPC ..... *H04W 76/023* (2013.01); *H04L 25/03019* (2013.01); *H04L 47/365* (2013.01);
(Continued)

(58) Field of Classification Search
CPC . H04W 76/02; H04W 76/023; H04W 76/043; H04W 8/00; H04W 8/005;
(Continued)

(56) References Cited

U.S. PATENT DOCUMENTS 8,891,497 B1 * 11/2014 Vleugels ............... H04W 84/22
370/334
9,351,230 B2 * 5/2016 Palin ..................... H04W 8/005
(Continued)

FOREIGN PATENT DOCUMENTS

| CN | 102668647 A | 9/2012 |
|---|---|---|
| CN | 103067776 A | 4/2013 |
| EP | 2590454 A1 | 5/2013 |

OTHER PUBLICATIONS

International Search Report for corresponding application No. PCT/CN2014/072155 filed on Feb. 17, 2014; Mail date May 19, 2014.

*Primary Examiner* — Warner Wong
(74) *Attorney, Agent, or Firm* — Cantor Colburn LLP

(57) ABSTRACT

The disclosure provides a terminal device, and frame sending and receiving methods, which relate to the field of communications. The terminal device includes: a confirming component configured to send a broadcast control frame to another terminal device which supports a Wireless Fidelity (Wi-Fi) direct-connecting technology, and confirm that the another terminal device which replies a broadcast response frame supports dynamic frame interaction after receiving the broadcast response frame replied by the another terminal device; and a scanning component configured to send a scanning request frame to the another terminal device which supports the dynamic frame interaction, wherein the field indicating the address of the receiving end in the scanning request frame is null. The length of the frames are greatly reduced by dynamically and self-adaptively adjusting the lengths of interaction frames for the frames in a scanning (Continued)

phase, a discovery phase and an operating phase respectively, thereby effectively solving the problem of power consumption; and meanwhile, a simple physical-connecting solution can be realized, and therefore devices which support Wi-Fi direct-connecting can simply interact with one another.

13 Claims, 4 Drawing Sheets

(51) Int. Cl.
    *H04L 25/03*     (2006.01)
    *H04W 76/04*     (2009.01)
    *H04W 8/00*     (2009.01)
    *H04W 8/24*     (2009.01)
    *H04W 84/12*     (2009.01)

(52) U.S. Cl.
    CPC ......... *H04W 8/005* (2013.01); *H04W 76/043* (2013.01); *H04W 8/24* (2013.01); *H04W 84/12* (2013.01); *Y02B 60/50* (2013.01)

(58) Field of Classification Search
    CPC ......... H04L 29/06306; H04L 29/08306; H04L 29/08396; H04L 67/1061; H04L 67/104; H04L 47/365; H04L 25/03019
    See application file for complete search history.

(56) References Cited

U.S. PATENT DOCUMENTS

| | | | | |
|---|---|---|---|---|
| 2011/0069636 | A1* | 3/2011 | Shao | H04W 72/02 370/254 |
| 2012/0188981 | A1* | 7/2012 | Chang | H04W 76/023 370/331 |
| 2012/0230247 | A1* | 9/2012 | Kwon | H04B 7/022 370/315 |
| 2013/0250904 | A1* | 9/2013 | Kang | H04B 7/0452 370/329 |
| 2014/0064486 | A1* | 3/2014 | Abraham | H04W 12/04 380/270 |
| 2014/0321321 | A1* | 10/2014 | Knaappila | H04W 52/0209 370/254 |
| 2015/0078230 | A1* | 3/2015 | Choi | H04W 74/04 370/311 |
| 2015/0085777 | A1* | 3/2015 | Seok | H04W 52/0216 370/329 |
| 2015/0341878 | A1* | 11/2015 | Lee | H04W 56/004 370/329 |
| 2015/0382287 | A1* | 12/2015 | Kim | H04W 76/023 370/338 |
| 2016/0050552 | A1* | 2/2016 | Kim | H04W 8/005 455/434 |

* cited by examiner

| Bytes: 2 | 2 | 6 | 6 | 6 | 2 | 6 | 2 | 0-23424 | 4 |
|---|---|---|---|---|---|---|---|---|---|
| Frame control field | Duration/ identifier | Address field 1 | Address field 2 | Address field 3 | Sequence control field | Address field 4 | Service Quality control | Frame body | Frame Check Sequence (FCS) |

Fig. 1

| Protocol version | Type field | Sub-type field | To Source Address (SA) | From SA | More fragments | Retry | Power management | More data | Protected frame | Order |
|---|---|---|---|---|---|---|---|---|---|---|
| bytes: 2 | 2 | 4 | 1 | 1 | 1 | 1 | 1 | 1 | 1 | 1 |

Fig. 2

| bytes: 2 | 2 | 6 | 6 | 6 | 2 | 0-2312 | 4 |
|---|---|---|---|---|---|---|---|
| Frame control | Duration | DA | Source address | BSSID | Sequence control | Frame body | FCS |

◄─────────── MAC Head ───────────►

Fig. 3

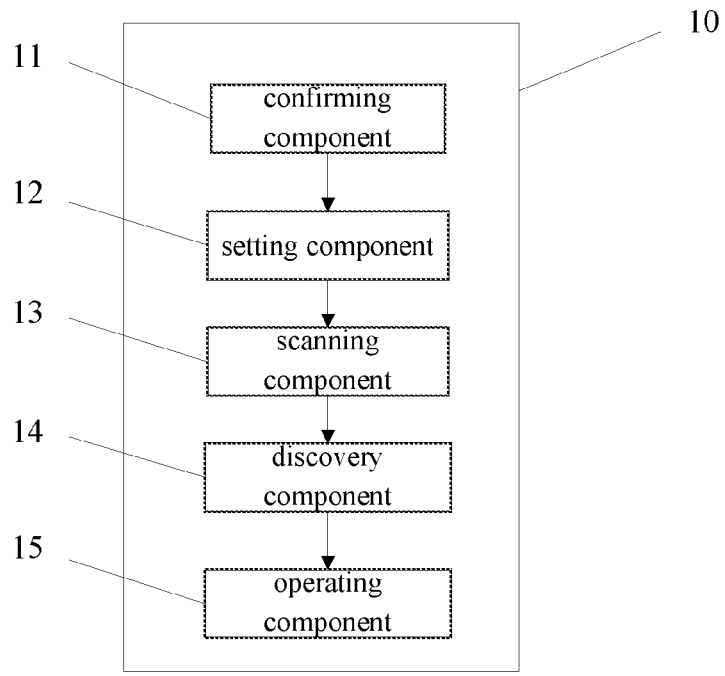

Fig. 4

TERMINAL DEVICE, AND FRAME SENDING AND RECEIVING METHODS

TECHNICAL FIELD

The disclosure relates to the field of communications, and in particular to a terminal device, and frame sending and receiving methods.

BACKGROUND

The Wireless Fidelity (Wi-Fi) Alliance published Wi-Fi direct-connecting white paper in October, 2010. Basic information, characteristics and functions about this technology are introduced in the white paper. A Wi-Fi direct-connecting standard refers to that devices in a wireless network are allowed to be connectable to one another without the need of a Wi-Fi router. Wi-Fi direct-connecting devices may be connected to one another anytime and anywhere. Due to no need of the Wi-Fi router or an Access Point (AP), the Wi-Fi devices may be connected at any places. A device discovery function and a service discovery function of Wi-Fi direct-connecting assist a user to determine available devices and service, which are then connected. Meanwhile, the Wi-Fi direct-connecting devices adopt Wi-Fi Protected Setup™, thereby simplifying a process of creating safe connection between the devices.

In a novel Wi-Fi direct-connecting network, there are two types of novel roles namely a group owner and a group client which are used to support Peer-to-Peer (P2P) connection. In a normalized definition, the group owner is compatible with a traditional Wi-Fi network and can act as a role of a Station (STA) or the AP, and in addition, P2P safe connection can be established between the group owner and multiple group clients. The group client is similar to the STA, and has functions of the STA as well as a function of establishing P2P connection with the group owner. A device may act as roles of the group owner and the group client at the same time. No matter whether traditional APs are distributed at the inner periphery of a room, a mobile terminal can be connected directly to other digital devices simply, quickly and safely by using Wi-Fi direct-connecting.

Currently, in a network structure using a Wi-Fi direct-connecting technology, a transmission rate and a connecting range are quite advantageous; meanwhile, the technology does not need to be supported by the wireless router so as to be convenient to achieve; however, the power consumption of the Wi-Fi direct-connecting technology is higher due to the problems of a transmitting power of a radio frequency antenna and the like, so that a device (terminal) adopting a direct current power supply is greatly influenced; and the Wi-Fi direct-connecting technology cannot be directly applied to the device adopting the direct current power supply.

In the traditional art, three types of 802.11 frames mainly exist. Data frames are in charge of data transmission between working stations. The data frames will be different due to different located network environments. Control frames cooperate with the data frames generally, are in charge of emptying a region, obtaining a channel and maintaining carrier sense, and give a straight answer when receiving data, thereby promoting the reliability of data transmission between the working stations. Management frames are in charge of supervision, and are mainly used to join or quit the wireless network and handle transfer events for connection between base stations.

The data frames will put data of an upper-layer protocol to a frame body for transfer. FIG. 1 shows a basic structure of each data frame.

The control frames mainly assist the data frames in transfer. They can be used to supervise access of a wireless medium (but not the medium itself), and provide the reliability of a Media Access Control (MAC) level.

As shown in FIG. 2, the control frames have the same frame control bit.

FIG. 3 shows a basic structure of each management frame. MAC headers of all the management frames are the same, which is irrelevant to sub-types of the frames. The management frames will exchange the data with other systems by using information elements (data blocks with digital tags).

According to a theoretical value, under the conditions that it is tested that an 11M rate of an 802.11b and a transmitting power (16 dbm generally) are certain, it is calculated that power consumed for receiving the data in unit time 100 ms is 410 mw and power consumed for sending the data is 500 mw. Meanwhile, by means of an actual network throughput (6M/s), it can be calculated that power consumed for receiving unit data 1 kbit is 0.68 mw and power consumed for sending the unit data 1 kbit is 0.83 mw.

SUMMARY

The embodiments of the disclosure are intended to provide a terminal device, and frame sending and receiving methods, which reduce the power consumption of the Wi-Fi direct-connecting devices caused by the problems of high sending power of the radio frequency antenna and the like and reduce the influence on the device adopting the direct current power supply so as to expand the technical field of application of a Wi-Fi Direct technology.

In order to solve the technical problems, an embodiment of the disclosure provides a terminal device, which may include:

a confirming component configured to send a broadcast control frame to another terminal device which supports a Wi-Fi direct-connecting technology, and confirm that the another terminal device which replies a broadcast response frame supports dynamic frame interaction after receiving the broadcast response frame replied by the another terminal device; and a scanning component configured to send a scanning request frame to the another terminal device which supports the dynamic frame interaction, wherein a field indicating an address of an receiving end in the scanning request frame is null.

The terminal device may further include:

a discovery component configured to receive the scanning request frame sent by the another terminal device which supports the dynamic frame interaction, parse the scanning request frame to obtain a parsing result, construct a scanning response frame if the parsing result shows that the field indicating the address of the receiving end in the scanning request frame sent by the another terminal device is null, and send the scanning response frame to the another terminal device, wherein type information and sub-type information is only retained in MAC header fields of the scanning response frame.

The terminal device may further include:

an operating component configured to send an operating data frame to the another terminal device which supports the dynamic frame interaction, wherein the length of frame body data area in the operating data frame is smaller than that of frame body data area in an original operating data frame.

The length of the frame body data area in the operating data frame is smaller than or equal to 10 bytes, a control type is identified by 1 byte in the frame body data area, and remaining data area is configured to store controlled additional data.

The frame body data area in the operating data frame may further include: an Element Identifier (Element ID) configured to identify whether the operating data frame is an extended operating data frame.

The operating component may be further configured to: receive the operating data frame sent by the another terminal device which supports the dynamic frame interaction, read the element ID in the frame body data area of the operating data frame, and judge whether the operating data frame is the extended operating data frame according to a value of the element ID.

Furthermore, when judging that the received operating data frame is the extended operating data frame, the operating component may read data in the first byte in the frame body data area of the operating data frame, obtain the control type of the another terminal device, read subsequent additional data according to the length of data stored in the second byte, parse complete control information according to the control type and the additional data, respond to a control operation carried out by the another terminal device according to the control information, and send result state information indicating whether the operation succeeds to the another terminal device.

Furthermore, the terminal device may further include:

a setting component configured to pre-set functions corresponding to the control information according to a type of the terminal device, wherein the control information may include the control type and the additional data.

An embodiment of the disclosure further provides a frame sending method, which may include that:

a broadcast control frame is sent to another terminal device which supports a Wi-Fi direct-connecting technology, and it is confirmed that the another terminal device which replies a broadcast response frame supports dynamic frame interaction after the broadcast response frames replied by the another terminal device is received; and a scanning request frame is sent to the another terminal device which supports the dynamic frame interaction, wherein a field indicating an address of a receiving end in the scanning request frame is null.

The frame sending method may further include that:

An operating data frame is sent to the another terminal device which supports the dynamic frame interaction, wherein the length of frame body data area of the operating data frame is smaller than that of frame body data area in an original operating data frame.

Preferably, the frame body data area in the operating data frame may further include: an element ID used for identifying whether the operating data frame is an extended operating data frame.

An embodiment of the disclosure further provides a frame receiving method, which may include that:

a broadcast control frame sent by another terminal device which supports a Wi-Fi direct-connecting technology is received, and a broadcast response frame is replied to the another terminal device to confirm that dynamic frame interaction is supported; and a scanning request frame sent by the another terminal device which supports the dynamic frame interaction is received, the scanning request frame is parsed to obtain a parsing result, a scanning response frame is constructed if the parsing result shows that field indicating the address of the receiving end in the scanning request frame sent by the another terminal device is null, and the scanning response frame is sent to the another terminal device, wherein type information and sub-type information is only retained in MAC header fields of the scanning response frames.

The receiving method may further include that:

an operating data frame sent by the another terminal device which supports the dynamic frame interaction is received, an element ID in frame body data area of the operating data frame is read, and it is judged whether the operating data frame is an extended operating data frame according to a value of the element ID.

The technical solutions of the embodiments of the disclosure at least have beneficial effects as follows.

The terminal device provided by an embodiment of the disclosure may greatly reduce the length of the frame by dynamically and self-adaptively adjusting the lengths of interaction frames for the frames in a scanning phase, a discovery phase and an operating phase respectively and sending enough information data according to characteristics of the Wi-Fi direct-connecting technology without the need of sending length-fixed data frames at each time, thereby effectively solving the problem of power consumption; and meanwhile, a simple physical-connecting solution can be realized, and therefore the devices which support Wi-Fi direct-connecting can simply interact with one another.

BRIEF DESCRIPTION OF THE DRAWINGS

FIG. 1 shows a basic structure of an 802.11 data frame;
FIG. 2 shows a frame control bit of an 802.11 data frame;
FIG. 3 shows a basic structure of an 802.11 management frame;
FIG. 4 shows a diagram of each component of a terminal device according to an embodiment of the disclosure.

DETAILED DESCRIPTION OF THE EMBODIMENTS

In order to make the technical problems intended to be solved, the technical solutions and the advantages of the disclosure clearer, the disclosure is described below with reference to the drawings and the embodiments in detail.

An embodiment of the disclosure provides a terminal device which is intended to solve the problems in the traditional art that the power consumption of the device which supports the Wi-Fi direct-connecting technology is higher and the device adopting the direct current power supply is greatly influenced. The lengths of the frames are greatly reduced by dynamically and self-adaptively adjusting the lengths of the interaction frames for the frames in the scanning phase, the discovery phase and the operating phase respectively and sending enough information data according to the characteristics of the Wi-Fi direct-connecting technology without the need of sending the length-fixed data frames at each time, thereby effectively solving the problem of power consumption; and meanwhile, the simple physical-connecting solution may be realized, and therefore the devices which support Wi-Fi direct-connecting may simply interact with one another.

As shown in FIG. 4, an embodiment of the disclosure provides a terminal device 10, which includes:

a confirming component 11 configured to send a broadcast control frame to another terminal device which supports a Wi-Fi direct-connecting technology, and confirm that the another terminal device which replies a broadcast response frame supports dynamic frame interaction after receiving the broadcast response frame replied by the another terminal device; and a scanning component 13 configured to send a scanning request frame to the another terminal device which supports the dynamic frame interaction, wherein a field indicating an address of a receiving end in the scanning request frame is null.

According to the terminal device 10 provided by the embodiment of the disclosure, in a confirming phase of Wi-Fi direct-connecting devices, a broadcast control frame is added to inquire whether a current Wi-Fi direct-connecting device supports the dynamic frame interaction, if YES, a broadcast response frame is replied to an inquiry device to indicate that the dynamic frame interaction is supported, and if NO, the another terminal device will not respond since the broadcast control frame is an extended control frame and the another terminal device can not identify the extended control frame.

After scanning is overtime, the terminal device 10 only locally records the device replying the broadcast response frame, and may carry out dynamic frame interaction with the device replying the broadcast response frame subsequently. The terminal device 10 may still interact with the another terminal device which do not support the dynamic frame interaction according to a conventional frame type, thereby ensuring the compatibility of various devices.

Figure 5:
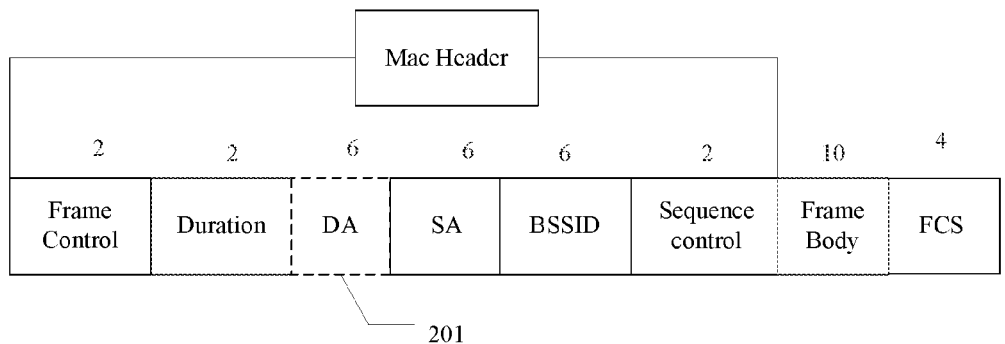
FIG. 5 shows an optimal structure chart of a scanning request frame according to an embodiment of the disclosure.

Preferably, the scanning component 13 sends a scanning request frame (Probe Request), which belongs to a management frame type and a broadcast control frame type. As shown in FIG. 5, in the management frame, an MAC address of a receiving end will be all filled with FFs, namely the field indicating the address of the receiving end in the scanning request frame is null. Thus, in this process, address field with 6 bytes in a frame structure may be removed.

Due to the fact that the scanning request frame will be quite frequently sent in practical operations, 6 bytes of each frame may be saved. Specifically speaking, according to the transmitting power consumption and receiving power consumption of unit data calculated in the background technology, by means of a standard beacon interval of 100 ms, in passive scanning, $(6*8*10*60/1024)*0.68=19.125$ mw may be saved after data are received for 1 minute, and $(6*8*10*60/1024)*0.83=23.34$ mw may be saved after the data are sent for 1 minute.

In another embodiment of the disclosure, the terminal device 10 further includes: a discovery component 14 configured to receive the scanning request frame sent by the another terminal device which supports the dynamic frame interaction, parse the scanning request frame to obtain a parsing result, construct a scanning response frame if the parsing result shows that the field indicating the address of the receiving end in the scanning request frame sent by the another terminal device is null, and send the scanning response frame to the another terminal device, wherein type information and sub-type information is only retained in MAC header fields in the scanning response frame.

Figure 6:
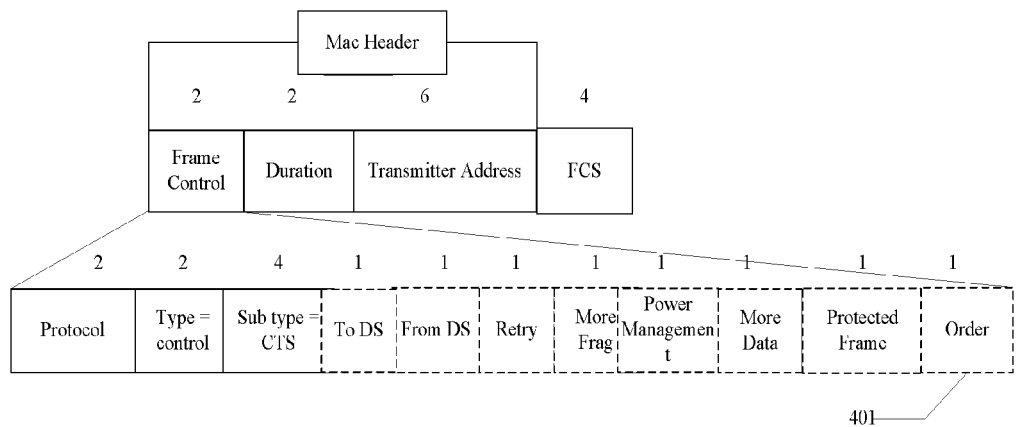
FIG. 6 shows an optimal structure chart of a scanning response frame according to an embodiment of the disclosure.

The discovery component 14 of the terminal device 10 provided by the embodiment of the disclosure mainly refers to that the Wi-Fi direct-connecting devices stay on all channels, respond to the received scanning request frames and then send the scanning response frames to the other terminal devices. An address field in the scanning response frame cannot be removed, otherwise the other terminal device cannot confirm MAC address in the scanning response frame; meanwhile, the scanning response frame is a control frame; as shown in FIG. 6, in consideration of the characteristics of the control frame, media access, extended fragment bits, retry bits, additional data and the like in MAC header fields are not specially required, so that these may be removed; only a type and a sub-type are needed in the MAC header fields in the control frame, supported protocol version is identified by the type field with 2 bit, and a frame type is identified by the sub-type field with 4 bit; thus, 2 bytes (16 bit) in each MAC header fields may be reduced to 1 byte (8 bit); and due to the low-speed transmission properties of the MAC header fields, the MAC header fields are shortened, and the transmission efficiency can be increased.

Specifically speaking, under the condition of the beacon interval of 100 ms, according to a theoretical calculation method, it may be calculated that 3.2 mw may be saved after the data are received for 1 minute and 3.9 mw may be saved after the data are sent for 1 minute.

In order to better reduce the power consumption, the terminal device 10 further includes:

an operating component 15 configured to send an operating data frame to the another terminal device which supports the dynamic frame interaction, wherein the length of frame body data area of the operating data frame is smaller than that of frame body data area of an original operating data frame.

The length of the frame body data area of the operating data frame is smaller than or equal to 10 bytes, a control type is identified by 1 byte in the frame body data area, and remaining data area is configured to store controlled additional data.

Figure 7:
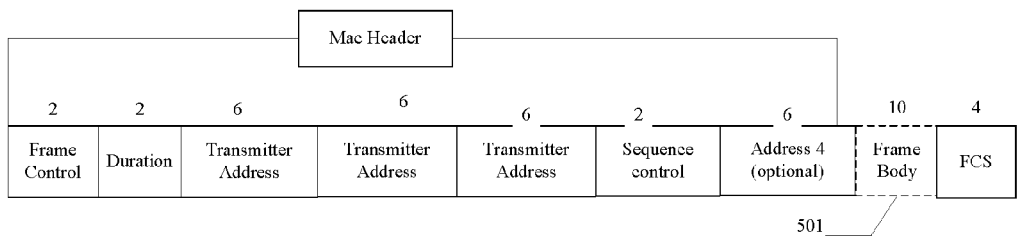
FIG. 7 shows an optimal structure chart of an operating data frame according to an embodiment of the disclosure.

In the terminal device 10 provided by the embodiment of the disclosure, the main optimizations of the operating component 15 are embodied in frame body data area, and the maximum length of the frame body data area of the original operating data frame is 2312 bytes. As shown in FIG. 7, in the operation interaction of the data area, 2312 bytes of the frame body data area are reduced to be less than 10 bytes, wherein 256 states namely 256 control states are identified by 1 byte, and the remaining bytes are configured to store the controlled additional data; the length of the remaining data area is dynamic, and may be 0 which indicates no need of the additional data such as an ON state and an OFF state; and at most 9 bytes may be enough, for example, temperature data of a refrigerator, air quantity data of an air conditioner and the like.

Preferably, the frame body data area of the operating data frame further include: an element ID used for identifying whether the operating data frame is an extended operating data frame.

In the terminal device 10 provided by the embodiment of the disclosure, during the operation interaction, it is self-defined that an element ID occupies a byte in frame body of the operating data frame in a dynamic Information Elements (IE) mode, and then the length of subsequent data is recorded to identify whether the operating data frame is the extended operating data frame. If the recorded data length is smaller than or equal to 10 bytes, the operating data frame is the extended operating data frame, and if NO, the operating data frame is not the extended operating data frame.

An example is taken as follows.

It is assumed that control information is sent to the refrigerator from the terminal device, the temperature is identified as 3 DEG C. If a cooling state code of the refrigerator, recorded before, is hexadecimal 20 and additional data is 3, data format of the frame body of the operating data frame is as follows:

|  |  | Data area | |
| --- | --- | --- | --- |
| Element ID | Data length | Control state | Additional data |
| 0xDD | 0x02 | 0x20 | 0x03 |

Specifically speaking, if the average length of frame body in the operating data frame is considered as 100 bytes according to an empirical value under the condition of dynamic frame bodies, 90 bytes may be saved for each operating data frame; and 30 data frames are sent per minute according to an average sending speed of the data frame, so that (90*8*30/1024)*0.68=14.35mw may be saved after the data are received for 1 minute, and (90*8*30/1024)*0.83=17.51mw may be saved after the data are sent for 1 minute. Under the condition of frequent data interaction, the power consumption of the data frames may be greatly reduced.

Preferably, the operating component 15 is further configured to: receive the operating data frame sent by the another terminal device which supports the dynamic frame interaction, read the element ID in the frame body data area of the operating data frame, and judge whether the operating data frame is the extended operating data frame according to a value of the element ID.

When judging that the received operating data frame is the extended operating data frame, the operating component 15 reads data in the first byte in the frame body data area of the operating data frame, obtains the control type of the another terminal device, read subsequent additional data according to the length of data stored in second byte, parses complete control information according to the control type and the additional data, responds to a control operation carried out by the another terminal device according to the control information, and sends result state information indicating whether the operation succeeds to the another terminal device.

In the terminal device 10 provided by the embodiment of the disclosure, the operating component 15 has a function of sending the operating data frame as well as a function of receiving and parsing the operating data frame. The operating component 15 judges whether the operating data frame is the extended operating data frame according to the element ID in the operating data frame first, and reads the first byte, identifying the control type of the another terminal device, in the frame body data area of the operating data frame if the operating data frame is the extended operating data frame; then the operating component reads the subsequent additional data according to the length of the data stored in the second byte, and parses the complete control information according to the control type and the additional data; and then P2P Wi-Fi direct-connecting device completes a function state requested by a control terminal, and send an operation success state or an operation failure state to the control terminal. Thus, the length of the frame is reduced, and the power consumption may be greatly reduced in frequent frame interaction.

In the traditional art, a physical-connecting network is widely applied to other technical fields. Thus, according to the disclosure, the physical-connecting network is combined with the Wi-Fi direct-connecting technology. According to another embodiment of the disclosure, the terminal device 10 further includes:

a setting component 12 configured to pre-set functions corresponding to the control information according to the type of the terminal device, wherein the control information comprises the control type and the additional data.

In the physical-connecting network, the setting component 12 pre-sets the functions corresponding to the control information according to the type of the terminal device 10 such as a temperature control bit of the refrigerator: 1, and an air quantity magnitude control bit of the air conditioner: 2. An one-to-one corresponding relationship may be stored in all terminals and devices in advance, open-type recording function control codes may be provided for a user, and the corresponding relationship may be set by the user according to own habits, hobbies and the like. The Wi-Fi direct-connecting technology is ingeniously combined with the physical-connecting network, thereby more facilitating the lives of people and meeting a humanized design.

An embodiment of the disclosure further provides a frame sending method, which includes that:

In step 111: a broadcast control frame is sent to another terminal device which supports a Wi-Fi direct-connecting technology, and it is confirmed that the another terminal device which replies the broadcast response frame supports dynamic frame interaction after the broadcast response frame replied by the another terminal device is received; and In step 112: a scanning request frame is sent to the another terminal device which supports the dynamic frame interaction, wherein a field indicating an address of a receiving end in the scanning request frame is null.

Figure 8:
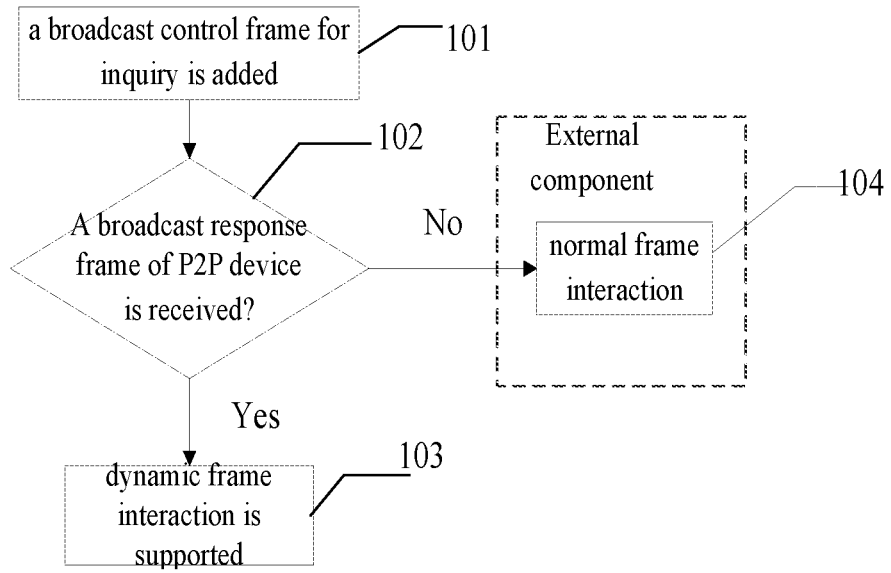
FIG. 8 shows a flowchart of a device confirming function according to an embodiment of the disclosure.

As shown in FIG. 8, according to the embodiment of the disclosure, the following specific steps are implemented in step 111.

In step 101: a broadcast control frame used for inquired is constructed.

In step 102: it is judged whether the broadcast response frame from the another terminal device within an overtime limit.

In step 103: if the broadcast response frame from the another terminal device is received within the overtime limit, it is shown that the another terminal device supports the dynamic frame interaction; and In step 104: if the broadcast response frame from the another terminal device is not received within the overtime limit, carrying out normal frame interaction.

The frame sending method further includes that:

Step 113: an operating data frame is sent to the another terminal device which supports the dynamic frame interaction, wherein the length of frame body data area in the operating data frame is smaller than that of frame body data area of an original operating data frame.

Preferably, the frame body data area in the operating data frame further includes: an element ID used for identifying whether the operating data frame is an extended operating data frame.

It is important to note that the method according to the embodiment is a method corresponding to the terminal device serving as a sending end. All embodiments for the terminal device are applicable to the method, and the technical effects identical to those of the terminal device can be achieved.

An embodiment of the disclosure further provides a frame receiving method, which includes that:

Step 211: a broadcast control frame sent by another terminal device which supports a Wi-Fi direct-connecting technology is received, and a broadcast response frame is replied to the another terminal device to confirm that dynamic frame interaction is supported; and Step 212: a scanning request frame sent by the another terminal device which supports the dynamic frame interaction is received, the scanning request frame is parsed to obtain a parsing result, a scanning response frame is constructed if the parsing result shows that a field indicating an address of a receiving end in the scanning request frame sent by the another terminal device is null, and the scanning response frame is sent to the another terminal device, wherein type information and sub-type information are only retained in MAC header field of the scanning response frame.

Figure 9:
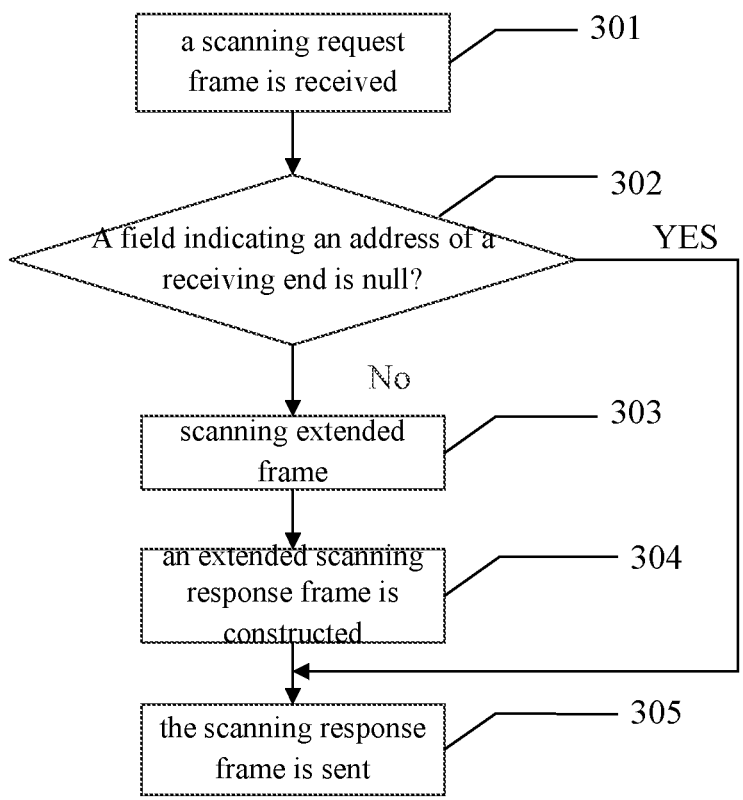
FIG. 9 shows a flowchart of parsing a scanning request frame according to an embodiment of the disclosure.

As shown in FIG. 9, Step 212 according to the embodiment of the disclosure specifically includes that:

Step 301: a scanning request frame is received;

Step 302: it is judged whether the field indicating the address of the receiving end in the received scanning request frames is null;

Step 303: if the field indicating the address of the receiving end is null, it is shown that the scanning request frame is a dynamically optimized request frame;

Step 304: an extended scanning response frame is constructed; and

Step 305: the scanning response frame is sent to the another terminal device.

The frame receiving method further includes that:

Step 213: an operating data frame sent by the another terminal device which supports the dynamic frame interaction is received, an element ID in frame body data area of the operating data frame is read, and it is judged whether the operating data frame is an extended operating data frame according to a value of the element ID.

Figure 10:
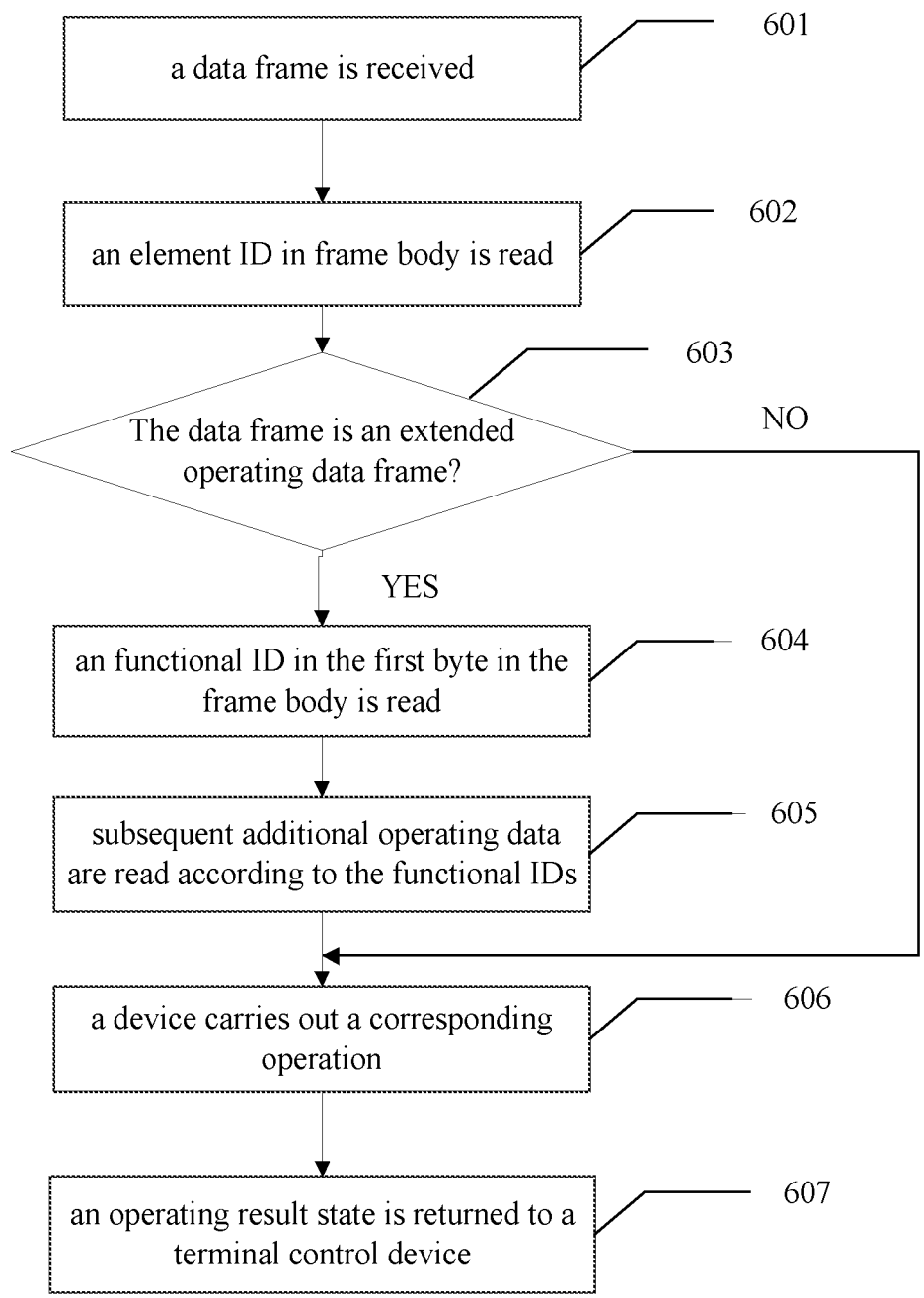
FIG. 10 shows a flowchart of parsing an operating data frame according to an embodiment of the disclosure.

As shown in FIG. 10, Step 213 according to the embodiment of the disclosure specifically includes that:

Step 601: the operating data frame sent by the terminal device is received;

Step 602: the element ID in frame body of the operating data frame is read;

Step 603: it is judged whether the operating data frame is the extended operating data frame according to the value of the element ID;

Step 604: if the operating data frame is the extended operating data frame, data in the first byte in the frame body data area of the operating data frame is read, wherein the data indicates a control type of the another terminal device;

Step 605: additional data of subsequent bytes is read according to the control type read in Step 604 and the length of data in the second byte;

Step 606: complete control information is parsed by means of the data read in Step 604 and Step 605, and an control operation from the another terminal device is responded; and Step 607: operating result state information is returned to a terminal control device, and operating result state information indicating whether an operating result succeeds is returned.

It is important to note that the method according to the embodiment is a method corresponding to the terminal device serving as a receiving end. All embodiments for the terminal device are applicable to the method, and the technical effects identical to those of the terminal device can be achieved.

In the embodiments of the disclosure, the length of the frame is greatly reduced by dynamically and self-adaptively adjusting the length of the interaction frame for the frames in the scanning phase, the discovery phase and the operating phase respectively and sending enough information data according to the characteristics of the Wi-Fi direct-connecting technology without the need of sending the length-fixed data frame at each time, thereby effectively solving the problem of power consumption; and meanwhile, the simple physical-connecting solution may be realized, and therefore the devices which support Wi-Fi direct-connecting may simply interact with one another.

The above is only implementations of the disclosure. It should point out that those ordinary skilled in the technical art can also make some improvements and modifications without departing from the embodiments of the disclosure. These improvements and modifications should fall within the protection scope of the disclosure.

INDUSTRIAL APPLICABILITY

The technical solutions provided by the embodiments of the disclosure can be applied to the technical field of communications. The lengths of the frames are greatly reduced by dynamically and self-adaptively adjusting the lengths of the interaction frames for the frames in the scanning phase, the discovery phase and the operating phase respectively and sending enough information data according to the characteristics of the Wi-Fi direct-connecting technology without the need of sending the length-fixed data frames at each time, thereby effectively solving the problem of power consumption; and meanwhile, the simple physical-connecting solution can be realized, and therefore the devices which support Wi-Fi direct-connecting can simply interact with one another.

The invention claimed is:

1. A terminal device, comprising:
   a confirming component configured to send a broadcast control frame to another terminal device which supports a Wi-Fi direct-connecting technology, and confirm that the another terminal device which replies a broadcast response frame supports dynamic frame interaction after receiving the broadcast response frame replied by the another terminal device; and
   a scanning component configured to send scanning request frame to the another terminal device which supports the dynamic frame interaction, wherein a field indicating an address of a receiving end in the scanning request frame is null.

2. The terminal device according to claim 1, further comprising:
   a discovery component configured to receive the scanning request frame sent by the another terminal device which supports the dynamic frame interaction, parse the scanning request frame to obtain a parsing result, construct a scanning response frame based on that the parsing result shows that the field indicating the address of the receiving end in the scanning request frames sent by the another terminal devices is null, and send the scanning response frame to the another terminal device, wherein type information and sub-type information is only retained in MAC header fields of the scanning response frame.

3. The terminal device according to claim 1, further comprising:
an operating component configured to send an operating data frame to the another terminal device which supports the dynamic frame interaction, wherein a length of frame body data area of the operating data frame is smaller than a length of frame body data area of an original operating data frame.

4. The terminal device according to claim 3, wherein the length of the frame body data area of the operating data frame is smaller than or equal to 10 bytes, a control type is identified by 1 byte in the frame body data area, and remaining data area is configured to store controlled additional data.

5. The terminal device according to claim 4, wherein the frame body data area of the operating data frame further comprises: an Element Identifier (Element ID) used for identifying whether the operating data frame is an extended operating data frame.

6. The terminal device according to claim 3, wherein the operating component is further configured to: receive the operating data frame sent by the another terminal device which supports the dynamic frame interaction, read the element ID in the frame body data area of the operating data frame, and judge whether the operating data frame is the extended operating data frame according to a values of the element ID.

7. The terminal device according to claim 6, wherein when judging that the received operating data frame is the extended operating data frame, the operating component reads data in a first byte in the frame body data area of the operating data frame, obtain a control type of the another terminal device, reads subsequent additional data according to a length of data stored in second byte, parses complete control information according to the control type and the additional data, responds to a control operation carried out by the another terminal device according to the control information, and sends result state information representing whether the operation succeed to the another terminal device.

8. The terminal device according to claim 7, further comprising:
a setting component configured to pre-set functions corresponding to the control information according to a type of the terminal device, wherein the control information comprises the control type and the additional data.

9. A frame sending method, comprising:
sending a broadcast control frame to another terminal device which supports a Wi-Fi direct-connecting technology, and confirming that the another terminal device which reply broadcast response frame support dynamic frame interaction after receiving the broadcast response frame replied by the another terminal device; and
sending a scanning request frame to the another terminal device which supports the dynamic frame interaction, wherein a field indicating an address of a receiving end of the scanning request frame is null.

10. The frame sending method according to claim 9, further comprising:
sending an operating data frame to the another terminal device which supports the dynamic frame interaction, wherein a length of a frame body data area of the operating data frame is smaller than a length of a frame body data area of an original operating data frame.

11. The frame sending method according to claim 10, wherein the frame body data area of the operating data frame further comprises: an Element Identifier (Element ID) used for identifying whether the operating data frame is an extended operating data frame.

12. A frame receiving method, comprising:
receiving a broadcast control frame sent by another terminal device which supports a Wi-Fi direct-connecting technology, and replying broadcast response frame to the another terminal device to confirm that dynamic frame interaction is supported; and
receiving a scanning request frame sent by the another terminal device which supports the dynamic frame interaction, parsing the scanning request frame to obtain a parsing result, constructing a scanning response frame if the parsing result shows that a field indicating an address of a receiving end of the scanning request frame sent by the another terminal device is null, and sending the scanning response frame to the another terminal device, wherein type information and sub-type information is only retained in MAC header field of the scanning response frame.

13. The frame receiving method according to claim 12, further comprising:
receiving an operating data frame sent by the another terminal device which supports the dynamic frame interaction, reading an Element Identifier (Element ID) in a frame body data area of the operating data frame is read, and judging whether the operating data frame is an extended operating data frame according to a value of the element ID.

* * * * *